(57.)
W. P. ROBINSON.
Improvement in Grain Scouring Machines.
No. 122,782.        Patented Jan. 16, 1872.
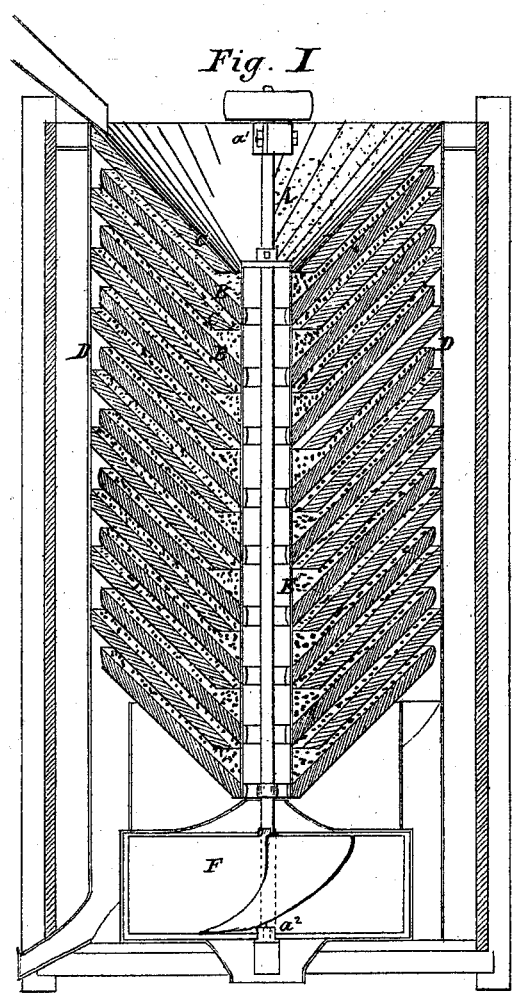
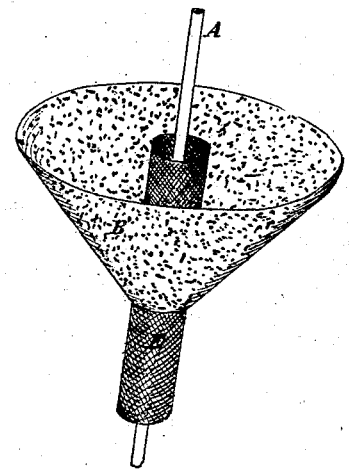
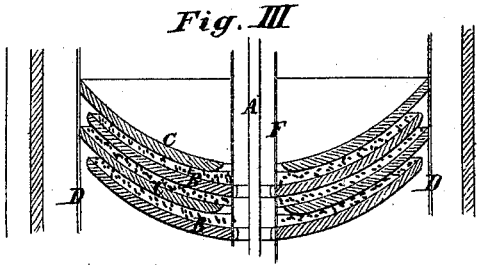
WITNESSES.
W. Pitt. Robinson M.D.
INVENTOR.

UNITED STATES PATENT OFFICE.

W. PITT ROBINSON, OF BUFFALO, NEW YORK.

IMPROVEMENT IN GRAIN-SCOURING MACHINES.

Specification forming part of Letters Patent No. 122,782, dated January 16, 1872.

Specification describing certain Improvements in Grain-Scouring Machines, invented by W. PITT ROBINSON, of the city of Buffalo, in the county of Erie and State of New York.

The first part of my invention relates to the construction, application, and use, in grain-scouring machines, of one or more conical scouring-wheels, supported upon a vertical shaft in such manner that when the grain is discharged upon the center of the wheel the revolution of the same will cause the grain to be moved outwardly and upwardly upon the inner and upper surface of the cone, during such passage, to be scoured, and finally to drop over the outer periphery of the wheel. The second part of my invention relates to the combination and arrangement of a series of conical or convex scouring-wheels upon a central shaft, with an equal number of stationary hoppers of a corresponding shape, in cross-section, to that of the conical wheels, and secured to an outer circular casing, each scouring-wheel revolving between two of the hoppers. The third part of my invention relates to the combination and arrangement of conical or convex scouring-wheels, correspondingly-shaped stationary hoppers, and an air-chamber or flue around the central shaft formed of wire-gauze or perforated metal, together with a fan-blower or other suitable device for forcing a current of air through said flue for the purpose of carrying off the dust, cuticle, and disintegrated matter, which is separated by the scouring process, through the perforated outer casing of the machine.

Figure I is a vertical section of my improved grain-scouring machine. Fig. II is a perspective view of one of the revolving conical scouring-wheels. Fig. III is a vertical section of part of a machine, showing a slight modification in the shape of the scouring-wheels and hoppers.

A represents a central shaft, which revolves in bearings $a^1$ $a^2$ formed upon the main frame of the machine. B B represent a series of scouring-wheels, and C C a series of hoppers of corresponding shape in cross-section, the former of which are secured to the shaft A and the latter to a perforated outer casing, D, connected to the main frame. The wheels and hoppers are conical or dishing, and are arranged in alternate succession from top to bottom of the machine, so that each wheel revolves between two hopper-plates, with, perhaps, the exception of the lowest wheel, as shown. Either or both the upper and lower faces of either or both of the wheels and hopper-plates may be covered with an emery composition for the purpose of producing a rough surface; or they may be formed of sandstone, metal, or any other suitable material now in general use in grain-scouring machines. E represents a tube, chamber, or flue, made of wire-gauze or perforated metal, which surrounds the central shaft A and revolves with the same. A current of air is forced into this flue by means of the fan-blower F, which may be of common and well-known construction. The air thus introduced will pass through the wire-gauze or perforations, and is distributed into the spaces between the conical wheels and hoppers. All dust, cuticle, or disintegrated matter will, by this current of air, be carried along and deposited outside of the casing D, from whence it may then be removed by any well-known method or device.

In Fig. III I have represented a modification in the shape of my scouring-wheels, and consequently also of the hoppers. Although I prefer the straight incline of the wheel, as shown in Figs. I and II, yet the same may also be made curved or convex, as shown in Fig. III, and answer the intent and purpose of my invention admirably. The angle of inclination upwardly from the horizontal plane of the sides of the wheels and hoppers, as well as the number of wheels used in each machine, may be varied according to the quality of the grain or the amount of scouring it requires.

The operation of my improved grain-scouring machine is simple and effective. The grain to be scoured is introduced at the top of the machine into the first hopper, C, and collects around the central flue E. The shaft A and conical wheels B are then revolved, and the grain is, by centrifugal force, carried upwardly and outwardly upon the inclined sides of the conical wheel until discharged into the second hopper, C, which again collects it around the central flue and passes it to the second wheel, and so on to the bottom of the machine. During the passage of the grain between each set of a wheel and adjacent hopper-plates it is thoroughly cleaned and scoured, and the refuse is carried off by the continuous current of air introduced through the flue E by the action of the fan-blower F.

The object and advantages of my improvement over other inventions for a similar purpose consist in the greater area of scouring-surface obtained in proportion to the size and dimensions of the machine complete.

I claim as my invention—

The combination of the emery-faced scouring-wheels B and hoppers C with the perforated flue E and fan F, when constructed and arranged as shown, and for the purpose set forth.

W. PITT ROBINSON, M. D.

Witnesses:
B. H. MUEHLE,
J. W. DOMINICK.

(57)